(12) United States Patent
Hwang et al.

(10) Patent No.: US 8,693,410 B2
(45) Date of Patent: Apr. 8, 2014

(54) METHOD AND APPARATUS OF HYBRID BURST MAPPING IN OFDMA SYSTEMS

(75) Inventors: Sung-Hyun Hwang, Daejeon (KR); Jung-Sun Um, Suwon (KR); Myung-Sun Song, Daejeon (KR); Chang-Joo Kim, Daejeon (KR); Gwangzeen Ko, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 604 days.

(21) Appl. No.: 12/665,861

(22) PCT Filed: Jun. 11, 2008

(86) PCT No.: PCT/KR2008/003242
§ 371 (c)(1),
(2), (4) Date: Mar. 8, 2010

(87) PCT Pub. No.: WO2008/156256
PCT Pub. Date: Dec. 24, 2008

(65) Prior Publication Data
US 2010/0202401 A1    Aug. 12, 2010

Related U.S. Application Data

(60) Provisional application No. 60/945,582, filed on Jun. 21, 2007, provisional application No. 60/948,011, filed on Jul. 5, 2007.

(30) Foreign Application Priority Data

May 27, 2008    (KR) .................. 10-2008-0049267

(51) Int. Cl.
*H04W 4/00*    (2009.01)
*H04J 3/00*    (2006.01)
*H04B 7/216*    (2006.01)

(52) U.S. Cl.
USPC ............ 370/329; 370/336; 370/341; 370/342

(58) Field of Classification Search
USPC .................................. 370/329, 336, 341, 342
See application file for complete search history.

(56) References Cited

U.S. PATENT DOCUMENTS

2005/0232181 A1* 10/2005 Park et al. ...................... 370/319
2006/0039274 A1*  2/2006 Park et al. ...................... 370/208

(Continued)

FOREIGN PATENT DOCUMENTS

JP    2008-526090 A    7/2008
WO    2005/055437 A2    6/2005

(Continued)

OTHER PUBLICATIONS

International Search Report; PCT/KR2008/003242.

(Continued)

*Primary Examiner* — Noel Beharry
*Assistant Examiner* — Kodzovi Acolatse
(74) *Attorney, Agent, or Firm* — Ladas & Parry LLP

(57) ABSTRACT

Provided are a method of adaptively allocating appropriate hybrid bursts according to terminal attributes including terminal position, channel state, and service type in an orthogonal frequency-division multiple access (OFDMA) system, and an upstream-MAP information element (US-MAP IE) structure supporting the method. The method includes dividing an upstream subframe into a plurality of zones depending on the number of OFDMA symbols and allocating bursts of a zone to a terminal according to the terminal attributes. Bursts are formed by allocating slots along a time axis in the upstream subframe, and are formed by allocating slots along a frequency axis in a downstream subframe.

18 Claims, 13 Drawing Sheets

(56) References Cited

U.S. PATENT DOCUMENTS

| | | | |
|---|---|---|---|
| 2006/0126553 A1* | 6/2006 | Lim et al. | 370/321 |
| 2007/0060145 A1* | 3/2007 | Song et al. | 455/445 |
| 2007/0206561 A1* | 9/2007 | Son et al. | 370/346 |
| 2007/0298808 A1* | 12/2007 | Pan et al. | 455/452.1 |
| 2008/0056390 A1* | 3/2008 | Rainbolt et al. | 375/260 |
| 2008/0075042 A1* | 3/2008 | Shih | 370/330 |

FOREIGN PATENT DOCUMENTS

| | | |
|---|---|---|
| WO | 2006/065069 A1 | 6/2006 |
| WO | 2006/071049 A1 | 7/2006 |

OTHER PUBLICATIONS

Itzik Kitroser, et al; "Additional comments to P802.16d/D2", IEEE 802.16 Broadband Wireless Access Working Group http://ieee802.org/16 Jul. 16, 2003; 21 pages.

Tal Kaitz, et al; "Untitled Document", IEEE 802.16 Broadband Wireless Access Working Group; http://ieee802.org/16; Jun. 26, 2004; 8 pages.

Chulsik Yoon, et al; "Changes on Downlink and Uplink Resource Allocation in OFDMA-PHY", IEEE 802.16 Broadband Wireless Access Working Group http://ieee802.org/16_2004-01-27; 11 pages.

* cited by examiner

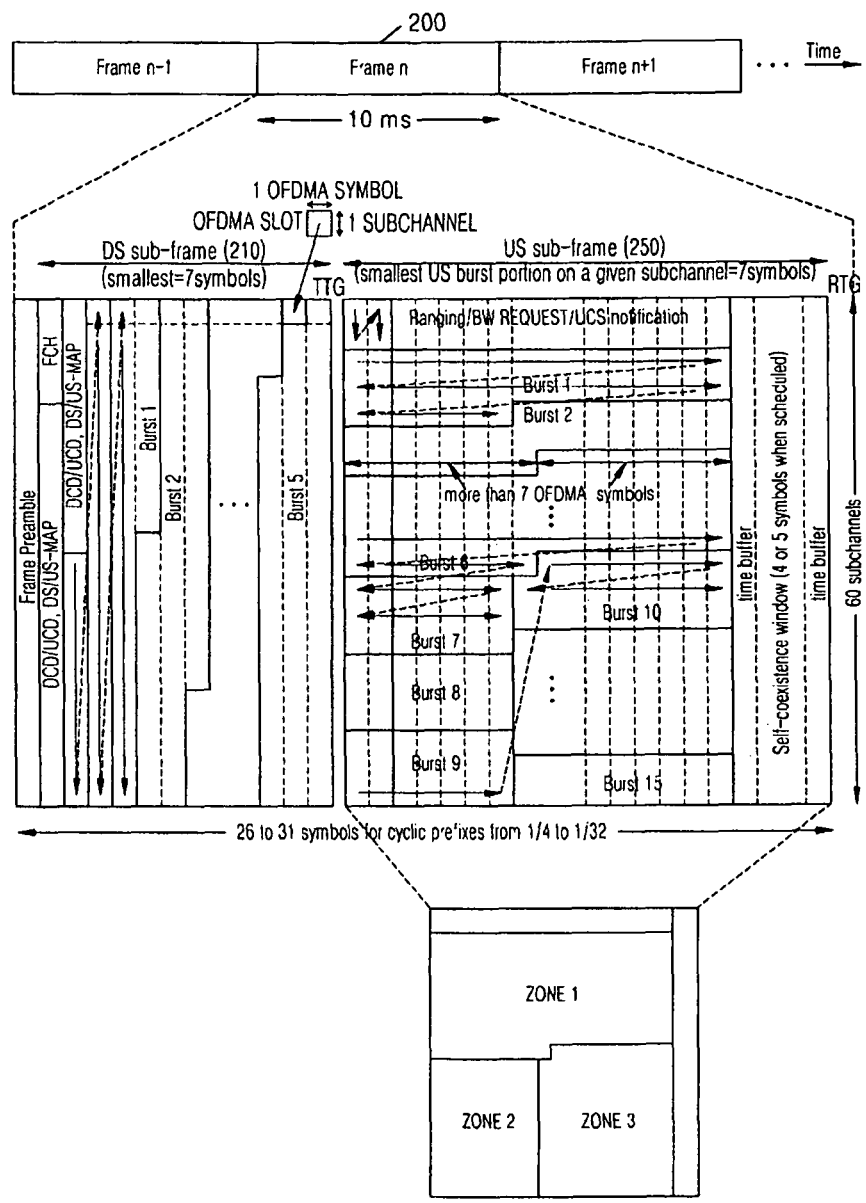

FIG. 5A

| Syntax | Size | Notes |
|---|---|---|
| US-MAP_IE() { | | |
| CID | 12 bits | |
| UIUC | 6 bits | |
| if ((UIUC 0) && (UIUC 1)) { | | |
| Number of symbols | 1 bit | Number of symbols for the coexistence window at the end of the frame including the one symbol buffer before the CBP burst and one symbol buffer following the CBP burst to absorb the propagation time.<br>0: 4 symbol SCW<br>1: 5 symbol SCW (4 or 5 symbols) (Note: SCW in passive mode, i.e., UIUC=1, shall always be 5 symbols) |
| US-MAP CBP Channel IE | 16 bits | |
| } else if (UIUC 2) && (UIUC 3)) { | | |
| Number of Subchannels | 4 bits | |
| } else if (UIUC 4) && (UIUC 6)) { | | |
| Number of Subchannels | 4 bits | |
| Number of symbols | 5 bits | |
| } else if (UIUC == 62) { | | |
| US_Extended_IE() | Variable | |
| } else if (UIUC == 7) { | | |
| CDMA_Allocation_IE() | 32 bits | |
| } else { | | |
| Burst_Type | 1 bits | This value specifies the burst type for the burst specified by this US-MAP IE.<br>0 = Bursts are mapped in the time axis over the full width of the upstream sub-frame before incrementing in the frequency axis;<br>1 = Bursts are mapped in the time axis over segments of 7 symbols before incrementing in the frequency axis and then re-tracing to the lowest unused subchannel in the next 7 symbol segment. The width of the last segment is to be between 7 and 13 symbols depending on the width of the upstream sub-frame |
| Duration | 12 bits | Number of OFDM slots linearly allocated to the US burst specified by this IE. (up to 60 by 30 slots can be allocated to a US burst.) |
| ⋮ | ⋮ | ⋮ |

FIG. 5B

| Syntax | Size | Notes |
|---|---|---|
| US-MAP_IE() { | | |
| CID | 2 bits | |
| UIUC | 6 bits | |
| if ((UIUC 0) && (UIUC 1)) { | | |
| Number of symbols | 1 bit | Number of symbols for the coexistence window at the end of the frame including the one symbol buffer before the CBP burst and one symbol buffer following the CBP burst to absorb the propagation time.<br>0: 4 symbol SCW<br>1: 5 symbol SCW (4 or 5 symbols) (Note: SCW in passive mode, i.e., UIUC=1, shall always be 5 symbols) |
| US-MAP CBP Channel IE | 16 bits | |
| } else if ((UIUC 2) && (UIUC 3)) { | | |
| Number of Subchannels | 4 bits | |
| } else if ((UIUC 4) && (UIUC 6)) { | | |
| Number of Subchannels | 4 bits | |
| Number of symbols | 5 bits | |
| } else if (UIUC == 62) { | | |
| US_Extended_IE() | Variable | |
| } else if (UIUC == 7) { | | |
| CDMA_Allocation_IE() | 32 bits | |
| } else { | | |
| Subchannel_Type | 1 bits | This value specifies the subchannel type for the burst specified by this US-MAP IE.<br>00 = Bursts are mapped in the time axis over the full width of the upstream sub-frame before incrementing in the frequency axis. This bursts are allocated in the zone of Diversity subchannels ;<br>01 = Bursts are mapped in the time axis over segments of 7 symbols before incrementing in the frequency axis and then re-tracing to the lowest unused subchannel in the next 7 symbol segment. The width of the last segment is to be between 7 and 13 symbols depending on the width of the upstream sub-frame. This bursts are allocated in the zone of Diversity subchannels ;<br>10 = Bursts are mapped in the time axis over the full width of the upstream sub-frame before incrementing in the frequency axis. This bursts are allocated in the zone of AMC subchannels ;<br>11 = Reserved |
| Duration | 12 bits | Number of OFDM slots linearly allocated to the US burst specified by this IE. (up to 60 by 30 slots can be allocated to a US burst.) |
| ⋮ | ⋮ | ⋮ |

FIG. 5C

| Syntax | Size | Notes |
|---|---|---|
| US-MAP_IE() { | | |
| CID | 12 bits | |
| UIUC | 6 bits | |
| if ((UIUC 0) && (UIUC 1)) { | | |
| Number of symbols | 1 bit | Number of symbols for the coexistence window at the end of the frame including the one symbol buffer before the CBP burst and one symbol buffer following the CBP burst to absorb the propagation time.<br>0: 4 symbol SCW<br>1: 5 symbol SCW (4 or 5 symbols) (Note: SCW in passive mode, i.e., UIUC=1, shall always be 5 symbols) |
| US-MAP CBP Channel IE | 16 bits | |
| } else if (UIUC 2) && (UIUC 3)) { | | |
| Number of Subchannels | 4 bits | |
| } else if (UIUC 4) && (UIUC 6)) { | | |
| Number of Subchannels | 4 bits | |
| Number of symbols | 5 bits | |
| } el se if (UIUC == 62) { | | |
| US_Extended_IE() | Variable | |
| } else if (UIUC == 7) { | | |
| CDMA_Allocation_IE() | 32 bits | |
| } else { | | |
| Subchannel_Type | 1 bits | This value specifies the subchannel type for the burst specified by this US-MAP IE.<br>00 = Bursts are mapped in the time axis over the full width of the Upstream sub-frame before incrementing in the frequency axis. This bursts are allocated in the zone of Diversity subchannels ;<br>01 = Bursts are mapped in the time axis over segments of 7 symbols before incrementing in the frequency axis and then re-tracing to the lowest unused subchannel in the next 7 symbol segment. This bursts are allocated in the ZONE 2 of Diversity subchannels;<br>10=Bursts are mapped in the time axis over segments of between 7 and 13 symbols before incrementing in the frequency axis and then re-tracing to the lowest unused subchannel in the next between 7 and 13 symbol segment. This bursts are allocated in the ZONE 3 of Diversity subchannels;<br>11=Bursts are mapped in the time axis over the full width of the upstream sub-frame before incrementing in the frequency axis. This bursts are allocated in the zone of AMC subchannels; |
| Duration | 12 bits | Number of OFDM slots linearly allocated to the US burst specified by this IE. (up to 60 by 30 slots can be allocated to a US burst.) |
| ⋮ | ⋮ | ⋮ |

METHOD AND APPARATUS OF HYBRID BURST MAPPING IN OFDMA SYSTEMS

TECHNICAL FIELD

The present invention relates to a method and apparatus for allocating hybrid bursts in an orthogonal frequency-division multiple access (OFDMA) system, and more particularly, to a method and apparatus for adaptively allocating appropriate hybrid bursts in consideration of terminal position, channel state, and service type in an OFDMA system, and an upstream-MAP information element (US-MAP IE) supporting the method.

BACKGROUND ART

FIGS. 1A and 1B illustrate a method of allocating bursts in a conventional orthogonal frequency-division multiple access (OFDMA) system. That is, FIG. 1A illustrates a time division duplexing (TDD) frame used by the conventional OFDMA system according to IEEE 802.16e worldwide interoperability for microwave access (WiMAX). FIG. 1 B illustrates the method of allocating bursts in the conventional OFDMA system of IEEE 802.16e WiMAX. Referring to FIG. 1A, the TDD frame includes a downlink subframe and an uplink subframe. The horizontal axis represents an OFDMA symbol number and the vertical axis represents a subchannel number.

Referring to FIGS. 1A and 1B, in downlink, the method allocates bursts in a rectangular shape defined by a start point and an end point. In uplink, the method allocates bursts by allocating slots, each of which is a smallest allocation unit defined by a subchannel and an OFDMA symbol, to one subchannel along a time axis until a last symbol is allocated, and then by continuously allocating slots to a next subchannel at a first symbol along the time axis. The method has the following problems.

1) Since a start point and an end point of a burst should be defined in downlink, the amount of overhead transmitted to each downlink-MAP information element (DL-MAP IE) is increased.

2) If start points of all bursts in an uplink subframe are the same, when a distance between a transmitter and a receiver is long and propagation latency is big, in case of a terminal receiving a last burst in a downlink subframe, a predefined transmit-receive transition gap (TTG) is not long enough to shift from a reception mode to a transmission mode, thereby making it difficult to transmit bursts in the same frame in uplink.

3) If end points of all the bursts in the uplink subframe are the same, it is difficult for a terminal requiring a quick response to the bursts transmitted in uplink to receive bursts of a next frame in downlink from a base station.

DESCRIPTION OF THE DRAWINGS

FIG. 2 illustrates a media access control (MAC) frame on time and frequency axes according to an embodiment of the present invention.

FIG. 5A illustrates an upstream-MAP information element (US-MAP IE) transmitting information on a burst allocation scheme when only a diversity subchannel exists according to an embodiment of the present invention.

FIGS. 5B and 5C illustrate US-MAP IEs transmitting information on a burst allocation scheme when a diversity subchannel and an AMC subchannel coexist according to embodiments of the present invention.

DETAILED DESCRIPTION OF THE INVENTION

Technical Problem

Figure 1A:
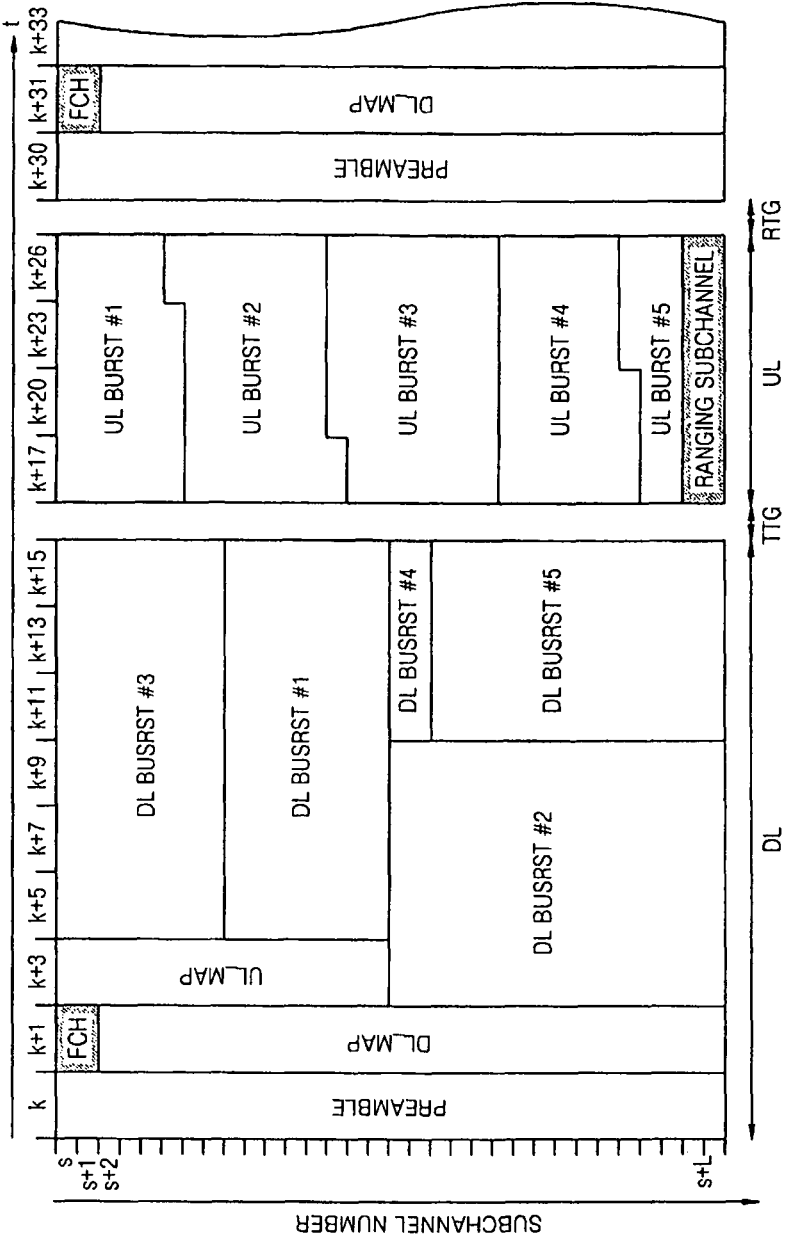
FIGS. 1A and 1B illustrate a method of allocating bursts in a conventional orthogonal frequency-division multiple access (OFDMA) system.
Figure 1B:
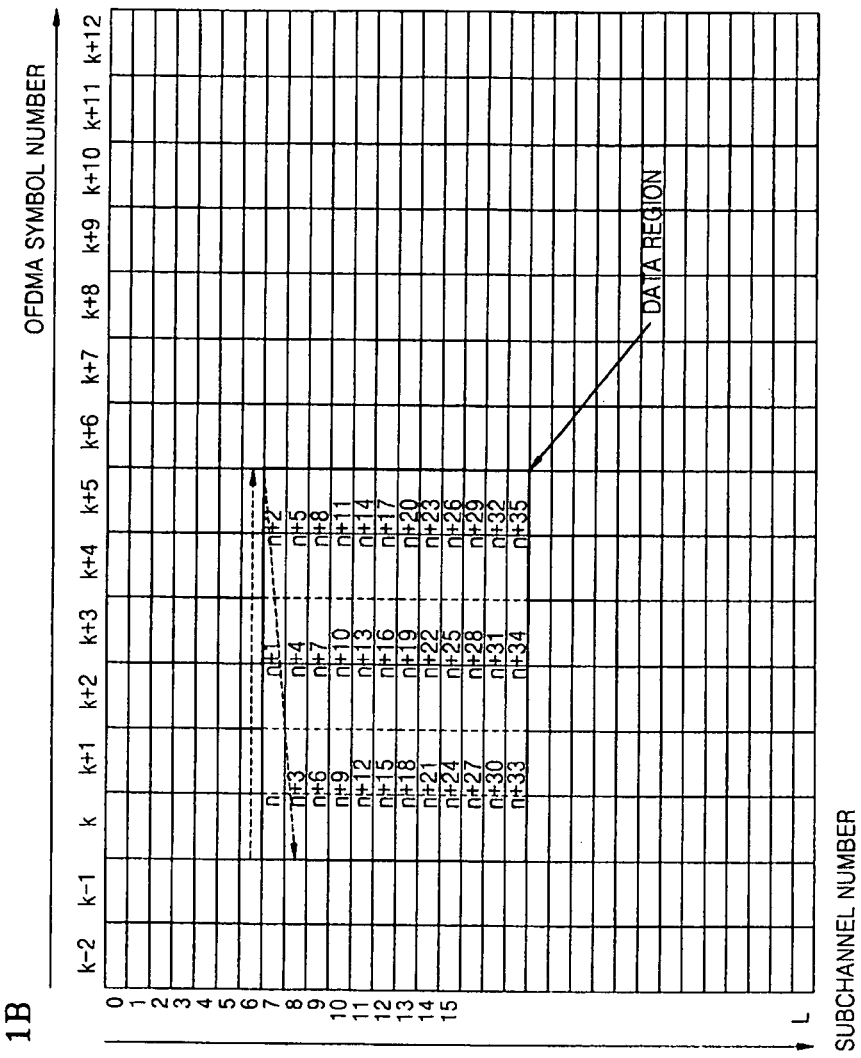

The present invention provides a method of adaptively allocating appropriate hybrid bursts in consideration of terminal position, channel state, and service type in an orthogonal frequency-division multiple access (OFDMA) system, and an upstream-MAP information element (US-MAP IE) supporting the method.

Other objects and advantages of the present invention will become more apparent by describing in detail exemplary embodiments thereof with reference to the attached drawings. Also, it is to be easily understood that the objects and advantages of the present invention could be realized through means and combinations thereof shown in the claims.

Technical Solution

According to an aspect of the present invention, there is provided a method and apparatus for adaptively allocating appropriate hybrid bursts in consideration of terminal position, channel state, and service type in an orthogonal frequency-division multiple access (OFDMA) system, and an upstream-MAP information element (US-MAP IE) supporting the method.

Advantageous Effects

According to the present invention, since bursts are formed by allocating fixed-size slots in an upstream subframe and a downstream subframe and thus the bursts are allocated according to the length of the bursts, the burst allocation information bits can be reduced and the amount of overhead can be reduced as well.

Since bursts in a downstream subframe are formed by allocating slots along a frequency axis and bursts in an upstream subframe are formed by allocating slots along a time axis, the bursts can be allocated adaptively to channel environment or terminal attributes.

Since bursts of an entire time zone of an upstream subframe are allocated to a power-limited terminal that is located at a cell boundary and does not permit line of sight (LOS) propagation in order to maximize transmitted power per subchannel of the power-limited terminal and the power-limited terminal maps data to the allocated bursts, a maximum signal to noise ratio (SNR) can be obtained.

Furthermore, since bursts of a previous time zone in the upstream subframe are allocated to a terminal requiring a quick response from a downstream subframe of a next frame, decoding latency till delivering to media access control (MAC) can be minimized.

Moreover, since bursts of a later time zone in the upstream subframe are allocated to a terminal that is located in a cell boundary and permits line-of-sight propagation, the terminal that does not have sufficient time to shift from a reception mode to a transmission mode with only a Tx to Rx transition gap (TTG) can have enough time.

BEST MODE

According to an aspect of the present invention, there is provided a method of allocating hybrid bursts by a base station to one or more terminals in a wireless communication system, the method comprising: sequentially allocating bursts, which are mapped along a frequency axis for downstream data transmission, to the respective terminals; and sequentially allocating bursts, which are mapped along a time axis for upstream data transmission, to the respective terminals.

The method may comprise: dividing a data burst region of an upstream subframe into a plurality of zones determined by a frequency domain and a time domain; selecting a zone corresponding to terminal attributes from among the plurality of zones; and sequentially allocating bursts, which are mapped along the time axis in the selected zone to the respective terminals.

According to another aspect of the present invention, there is provided a method of transmitting and receiving data by a terminal using hybrid bursts allocated by a base station in a wireless communication system, the method comprising: detecting downstream data burst allocation information on downstream data bursts, which are mapped along a frequency axis, and upstream data burst allocation information on upstream data bursts, which are mapped along a time axis, from a frame received from the base station; receiving data by using the downstream data bursts allocated based on the detected downstream data burst allocation information; and transmitting data by using the upstream data burst allocated based on the detected upstream data burst allocation information.

According to another aspect of the present invention, there is provided an apparatus for allocating hybrid bursts by a base station to one or more terminals in a wireless communication system, the apparatus comprising: a burst forming unit forming bursts mapped along a frequency axis for downstream data transmission and forming bursts mapped along a time axis for upstream data transmission; and a burst allocating unit sequentially allocating the formed bursts to the respective terminals.

The apparatus may further comprise: a region dividing unit dividing a data burst region of an upstream subframe into a first zone comprising all symbols of the data burst region of the upstream subframe and a remaining portion other than the first zone, and dividing the remaining portion other than the first zone into a second zone and a third zone in a time domain; and a zone selecting unit selecting the first zone for a terminal sensitive to power, selecting the second zone for a terminal sensitive to propagation latency, and selecting the third zone for a terminal requiring a quick response from the base station.

According to another aspect of the present invention, there is provided a terminal apparatus for transmitting and receiving data using hybrid bursts allocated by a base station in a wireless communication system, the terminal apparatus comprising: a burst allocation information detecting unit detecting downstream data burst allocation information on downstream data bursts, which are mapped along a frequency axis, and upstream data burst allocation information on upstream data bursts, which are mapped along a time axis, from a frame received from the base station; a received data processing unit processing received data by using the downstream data bursts allocated based on the detected downstream data burst allocation information; and a transmitted data processing unit processing transmitted data by using the upstream data bursts allocated based on the detected upstream data burst allocation information.

According to another aspect of the present invention, there is provided a computer-readable recording medium having embodied thereon a program for executing the method of allocating the hybrid bursts and the method of transmitting and receiving the data.

MODE OF THE INVENTION

The present invention will now be described more fully with reference to the accompanying drawings, in which exemplary embodiments of the invention are shown. Although the same elements are shown in different drawings, like reference numerals in the drawings denote like elements. Detailed explanation will not be given when it is determined that detailed explanation about well-known function and configuration of the present invention may dilute the point of the present invention.

Unless the context dictates otherwise, the word "comprise" or variations such as "comprises" or "comprising" is understood to mean "includes, but is not limited to" such that other elements that are not explicitly mentioned may also be included.

For effective explanation, the present invention will be explained with reference to IEEE 802.22.

The present invention relates to burst allocation (burst mapping), and also relates to a downstream/upstream MAP (DS/US MAP) design. A method of allocating bursts (resources) in a frame for communications between a base station and terminals in an orthogonal frequency-division multiple access (OFDMA) system should consider the following features:

1) the amount of overhead required by a downlink/uplink MAP information element (DL/UL MAP IE) according to the 802.16e OFDMA standard, 2) time diversity gain expected by a fast time-varying channel, 3) decoding latency till delivering to media access control (MAC), 4) stable channel estimation performance, and 5) burst allocation adaptive to terminal position, channel state, and service type.

Since an IEEE 802.16e worldwide interoperability for a microwave access (WiMAX) OFDMA system allocates bursts in a rectangular shape defined by a start point and an end point in downlink in order to consider time diversity gain expected by a fast time-varying channel and to minimize decoding latency, the amount of overhead is increased A fixed IEEE 802.22 Wireless Regional Area Network (WRAN) system does not need to consider time diversity gain, but should allocate bursts so that frequency selective fading caused by a large cell radius of 30 to 100 Km and a plurality of paths can be effectively mitigated.

Accordingly, it is not rational to directly apply a burst allocation method used by the IEEE 802.16e WiMAX OFDMA system to the IEEE 802.22 WRAN system.

FIG. 2 illustrates two dimensional structure of a MAC frame on horizontal and vertical axes according to an embodiment of the present invention. In FIG. 2, a transmission mode for upstream and downstream is a time division duplexing (TDD) transmission mode.

Referring to FIG. 2, one frame 200 is comprised of a downstream (DS) subframe 210 and an upstream (US) subframe 250, and includes an integer number of fixed-size OFDMA slots. In the present invention, one OFDMA slot is given by 1 OFDMA slot=1 OFDMA symbol×1 subchannel.

The DS subframe 210 includes a MAC information region including frame preamble, frame control header (FCH), DS-MAP, US-MAP, downstream channel descript (DCD), and upstream channel descript (UCD), and a data burst region. The US subframe 250 includes a ranging/BW request/UCS notification region for contention access, a self-coexistence window region for coexistence with a neighboring WRAN, and a data burst region.

The DS-MAP and the US-MAP define positions and usages of bursts allocated in the DS subframe and the US subframe, respectively. When bursts are formed by allocating fixed-size slots in the US subframe and the DS subframe and a linear allocation scheme that only needs to define bursts information with the number of slots, that is, the length of a burst, is used, the amount of overhead required by the DS-MAP and the US-MAP can be minimized. In particular, the DS-MAP and the US-MAP include information on a subchannel type and a method of allocating bursts to each of terminals.

In the DS subframe, data bursts are formed by sequentially allocating the data bursts to slots along a subcarrier of one OFDMA symbol, that is, along a frequency axis, in consideration of channel environment. In the US subframe, data bursts are formed by sequentially mapping the data bursts to slots along a time axis in consideration of the location of customer premises equipment (CPE) and burst transmission power. Bursts in an upper portion in the data burst region of the US subframe are sequentially mapped to slots along the time axis, and bursts in a lower portion in the data burst region of the US subframe are sequentially mapped to slots along the time axis on a seven-symbol basis that allows channel estimation.

When a terminal requires maximum effective isotropic radiated power (EIRP), if a great number of OFDMA symbols in a time domain are used and a small number of subchannels in a frequency domain are used, power per subchannel is maximized and the coverage of the terminal is increased. Accordingly, bursts each having a width of 7 OFDMA symbols in the US subframe are allocated to a latency-sensitive terminal, and bursts each having the same width as the entire width of the US subframe are allocated to a power-sensitive terminal.

Figure 3:
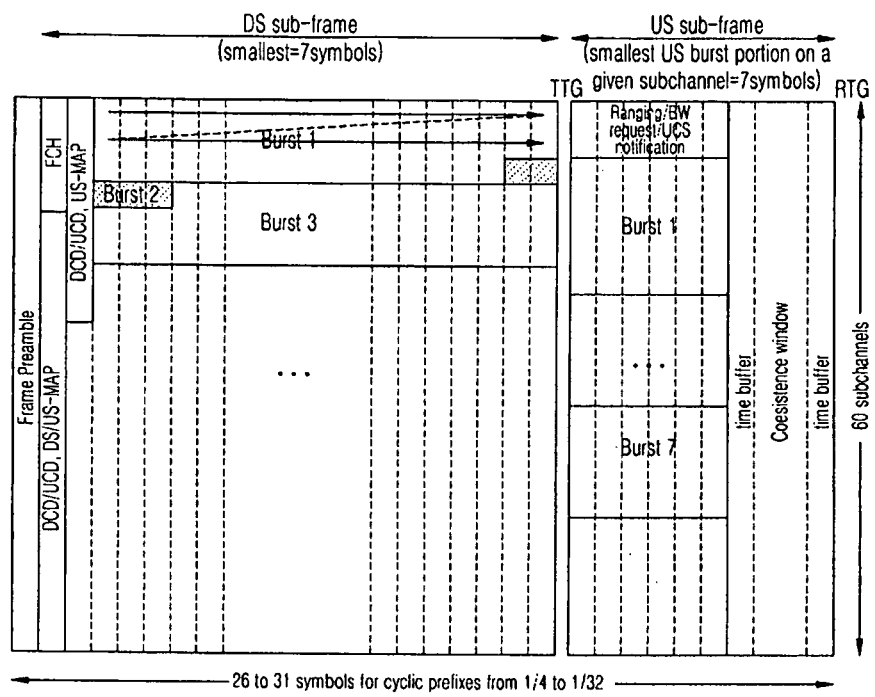
FIG. 3 illustrates a large decoding-latency MAC frame on time and frequency axes.

In the DS subframe, since there is no need to consider time diversity gain in a fixed communication system, bursts are first allocated along the frequency axis so as to minimize decoding latency till delivering to MAC. FIG. 3 illustrates a large decoding-latency MAC frame on time and frequency axes. Although the size of a burst 2 is small, decoding latency is increased because it is waited for the entire long block from first symbol to last symbol before the burst 2 is decoded.

In the US subframe, since channel estimation should be performed by terminals by using only pilot symbols received by terminals, bursts are allocated so as to maximize channel estimation performance. For example, since an IEEE 802.22 WRAN system requires 7 OFDMA symbols for optimal channel estimation performance, each of all bursts is made up of 7 or more symbols.

In order to satisfy conditions for channel estimation, the data burst region of the US subframe is divided into a first zone including all symbols of the US subframe and a remaining portion that is subdivided into a plurality of segments each including 7 symbols. Bursts are mapped to slots in each of the first zone and the segments. When a last segment includes six or less symbols, the last segment is included in a previous segment. That is, when the number of OFDMA symbols included in the data burst region of the US subframe except self-coexistence window and buffers located before and after the self-coexistence window is X, the number X may be given by $$X=7*Y+Z=7*(Y-1)+(7+Z), Z<7$$

Accordingly, X symbols are included in Y−1 segments each including 7 symbols and one segment including 7+Z symbols, and the segment including the 7+Z symbols is always located right before the self-existence window of the US subframe.

That is, the number of symbols of each of the segments is equal to the minimum number of symbols necessary for channel estimation, and the number of symbols of a last segment is equal to or greater than the minimum number of symbols necessary for channel estimation and less than two times the minimum number of symbols necessary for channel estimation.

For example, when the number of all OFDMA symbols of the data burst region in the US subframe is 16 and the minimum number of symbols necessary for channel estimation is 7, the data burst region is divided into one segment including 7 OFDMA symbols and one segment including 9 OFDMA symbols along the time axis.

While one segment includes 7 to 13 symbols in consideration of the minimum number, e.g., 7, of symbols necessary for channel estimation and each zone includes one or more segments for convenience of explanation, the terms used to explain the present invention should not be construed as limiting the scope of the present invention. Accordingly, it will be understood by those of ordinary skill in the art that various changes in form and details may be made therein without departing from the spirit and scope of the present invention. Embodiments will now be explained based on the terms.

In FIG. 2, the data burst region of the US subframe is divided into three zones. That is, an upper portion of the data burst region of the US subframe which includes all symbols of the data burst region of the US subframe 250 is a first zone ZONE 1, and a remaining portion is subdivided into two segments, that is, a second zone ZONE 2 and a third zone ZONE 3, in a time domain.

A method of mapping data according to the present invention will now be explained in detail with reference to FIG. 2.

In downstream, MAC data elements are vertically sequentially mapped to subchannels, and then horizontally sequentially mapped to the subchannels in a time direction.

Data input to FCH and a first broadcast burst are mapped in the order in which a subchannel number increases from a second OFDMA symbol. The method continues until all subchannels in the second OFDMA symbol are occupied. Once all the subchannels in the second OFDMA symbol are occupied, data are mapped in the order in which a subchannel number increases in a third OFDMA symbol.

In upstream, MAC data elements are mapped in the order different from that in downstream. The MAC data elements are sequentially mapped to OFDMA symbols in the same subchannel. Once data are filled up to a maximum capacity, data are mapped to a next sub channel with a higher subchannel number. The method continues until all subchannels and symbols allocated to bursts are used. If the quantity of the MAC data elements is insufficient to fill the bursts, padding may be inserted at the end. The MAC data elements may be horizontally mapped on a 7-orthogonal frequency division multiplexing (OFDM) symbol basis. In detail, the MAC data elements are sequentially mapped to OFDMA symbols in the same subchannel of one vertical column including 7 OFDMA symbols. When all slots are filled in the present vertical column, the MAC data elements are sequentially mapped to OFDMA symbols in a first subchannel of a next vertical column. A last vertical column may have a width of 7 to 13 symbols according to the total number of symbols of the US subframe. When all the MAC data elements are mapped to the US subframe, a balance of the last OFDMA symbols is padded with 0s. The US-MAC indicates the length of the US-MAP element, not the absolute position in the US subframe. Here, vertical columns correspond to the aforesaid segments.

Bursts may be allocated for the ranging/BW request/UCS notification region by a rectangular burst allocation scheme.

A method of adaptively allocating hybrid bursts in consideration of terminal position, channel state, and service type according to an embodiment of the present invention will now be explained in detail. The method divides the US subframe 250 into three zones ZONE 1, ZONE 2, and ZONE 3 as shown in FIG. 2, and selects one of the three zones ZONE 1, ZONE 2, and ZONE 3 to allocate bursts to a terminal in consideration of terminal attributes. The terminal attributes are determined by at least one of terminal position, channel state, and service type.

1) Bursts of the first zone ZONE 1 are allocated to a power-limited terminal that is located at a cell boundary and does not permit line-of-sight propagation in order to maximize transmission power.

2) Bursts of the second zone ZONE 2 are allocated to a terminal that requires a quick response in a DS subframe of a next frame in order to minimize decoding latency till delivering to MAC.

3) Bursts of the third zone ZONE 3 are allocated to a terminal that is located at a cell boundary and permits line-of-sight propagation and does not have sufficient time to shift from a reception mode to a transmission mode within a Tx to Rx transition gap (TTG) in order for the terminal to get enough time through scheduling.

Although the remaining portion other than the first zone ZONE 1 is divided into two segments, that is, the two zones ZONE 2 and ZONE 3, in FIG. 2, the remaining portion other than the first zone ZONE 1 may be divided into three or more segments according to system environment and design, making it possible to more minutely consider the terminal attributes. Although each of the second zone ZONE 2 and the third zone ZONE 3 includes one segment in FIG. 2, each of the second zone ZONE 2 and the third zone ZONE 3 may include two or more segments. In this case, bursts may be mapped to the segments of each of the second zone ZONE 2 and the third zone ZONE 3 in the same manner as that described above.

Figure 4A:
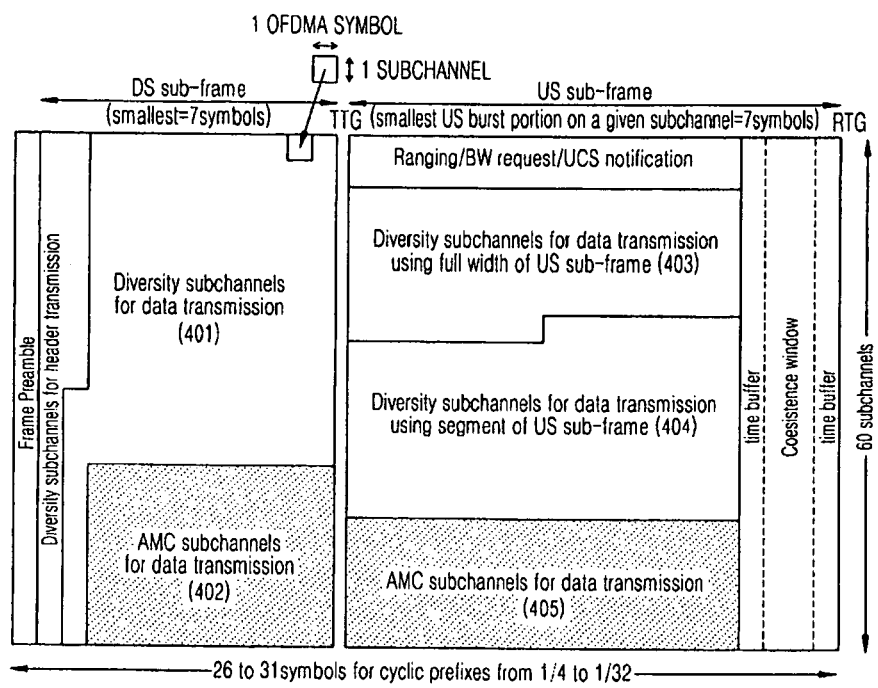
FIGS. 4A through 4C illustrate a method of allocating hybrid bursts in a diversity subchannel region and a band adaptive modulation and coding (AMC) subchannel region according to an embodiment of the present invention.
Figure 4B:
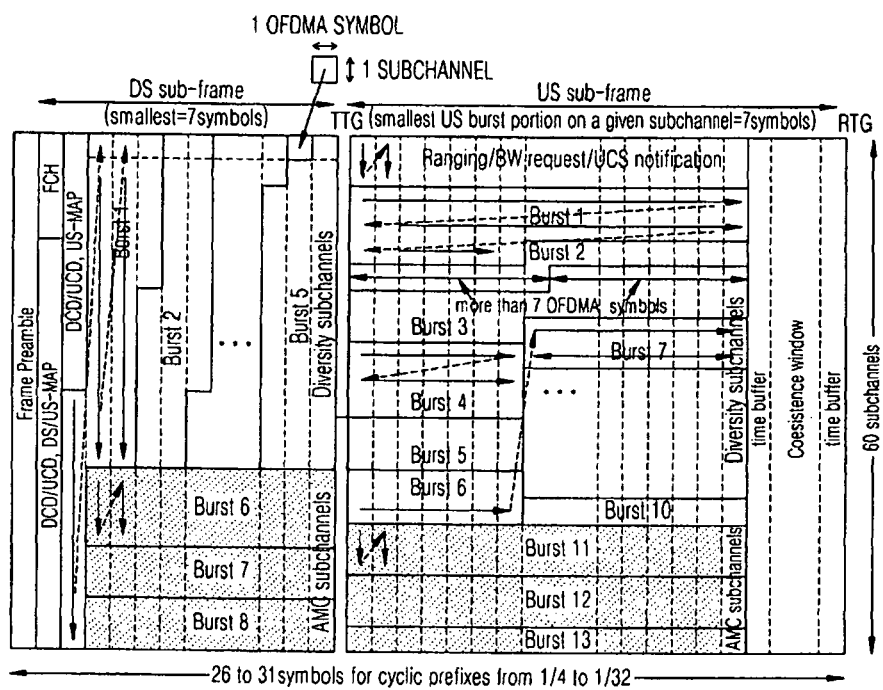
Figure 4C:
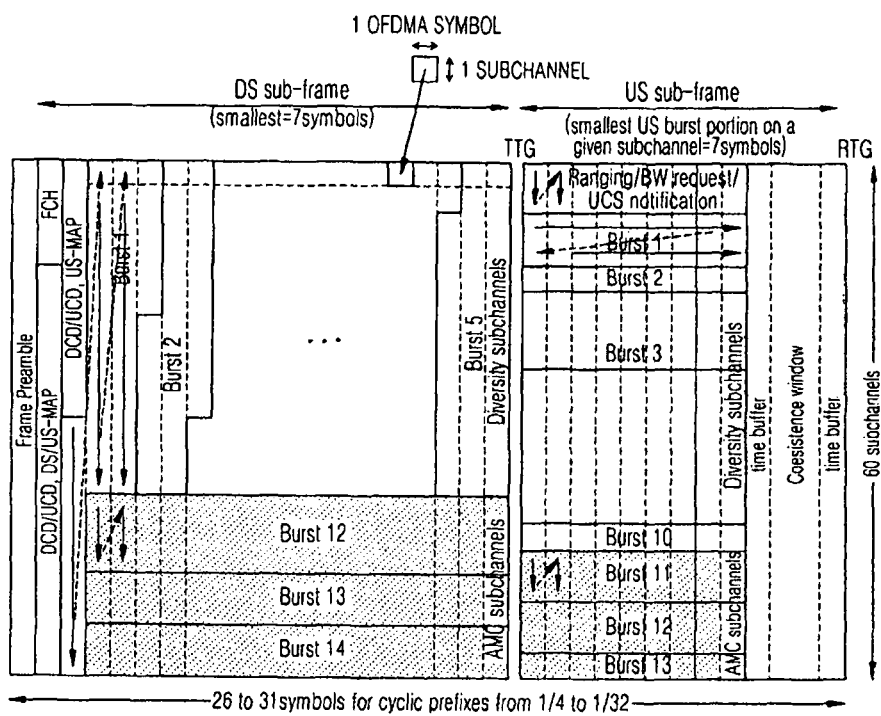

FIG. 4A illustrates a diversity subchannel region and a band adaptive modulation and coding (AMC) subchannel region according to an embodiment of the present invention. FIG. 4B illustrates a method of allocating hybrid bursts when a diversity subchannel and an AMC subchannel coexist and a US subframe includes 14 or more OFDM symbols. FIG. 4C illustrates a method of allocating hybrid bursts when a diversity subchannel and an AMC subchannel coexist and a US subframe includes 7 to 13 OFDMA symbols. The method of allocating hybrid bursts according to the present invention may also be applied to a case where an AMC subchannel exists.

Referring to FIG. 4A, each of an AMC subchannel zone and a diversity subchannel zone may have a rectangular shape in a frequency domain. The AMC subchannel zone is identified by using DS/US-MAP, and a remaining portion other than AMC subchannel zone is assigned to the diversity subchannel zone. The AMC subchannel zone starts from an OFDMA symbol next to an OFDMA symbol to which header including FCH, DS/US-MAP, and DCD/UCD is allocated, so that a terminal can know the range of an AMC subchannel from the DS-MAP. Remaining subchannels in the same OFDMA symbol excluding a header field are allocated a diversity subchannel for data transmission.

A data burst region of a DS subframe may be divided into a diversity subchannel zone 401 for data transmission and an AMC subchannel zone 402 for data transmission. A data burst region of a US subframe may be divided into a diversity subchannel zone 403 for data transmission using the entire width of the US subframe, a diversity subchannel zone 404 for data transmission using segments of the US subframe, and an AMC subchannel zone 405 for data transmission.

Referring to FIG. 4B, in a DS subframe, for an AMC subchannel and a diversity subchannel, bursts are first mapped along a frequency axis vertically. In a US subframe, for a diversity subchannel, bursts are first mapped along a time axis horizontally, and for an AMC subchannel, bursts are first mapped along the frequency axis vertically. In consideration of terminal attributes, the US subframe may be divided into an upper portion including all OFDM symbols and a lower portion that is divided into one or more segments collectively including all OFDM symbols.

Referring to FIG. 4C, a method of allocating hybrid bursts in a DS subframe and a US subframe is the same as that of FIG. 4B. However, since the number of OFDMA symbols of the US subframe is 13 or less, a portion is not divided into 2 or more segments and each of bursts includes all OFDMA symbols.

FIG. 5A illustrates a US-MAP IE transmitting information on a burst allocation scheme when only a diversity subchannel exists according to an embodiment of the present invention. FIGS. 5B and 5C illustrate US-MAP IEs transmitting information on a burst allocation scheme when a diversity subchannel and an AMC subchannel coexist according to embodiments of the present invention.

In order to support the method of allocating hybrid bursts, information on a burst allocation scheme of a US subframe should be transmitted to a US-MAP. A US-MAP IE defines US bandwidth allocation information. Allocation starts from a lowest numbered subchannel on a first non-allocated symbol according to a start time field allocation of a US-MAP message. Each IE represents information on the position of bursts allocated to a terminal by using the number (length) of OFDMA slots. Each burst starts right after a previous burst along a time axis. When a last symbol of the US subframe is reached, burst mapping continues from a next subchannel of the first symbol. The US subframe may be defined using columns, that is, segments, each including a minimum number of symbols necessary for channel estimation.

Information on each burst allocation scheme may be transmitted to a US-MAP by using vector data before a US-MAP IE starts, or may be transmitted to a US-MAP by using a US-MAP IE corresponding to each burst.

FIG. 5A illustrates an US-MAP IE whose 1-bit message Burst_Type is used when only a diversity subchannel exists. Referring to FIG. 5A, the 1 bit of the message Burst_Type specifies a burst type defined by this US-MAP IE. The message Burst_Type may be expressed as '0' when bursts are mapped along a time axis over the entire width of an US subframe before incrementing in a frequency axis. The message Burst_Type may be expressed as '1' when bursts are mapped along the time axis over segments of 7 symbols before incrementing along the frequency axis and then re-tracing to a lowest unused subchannel in a next 7 symbol segment. A last segment has a width ranging from 7 to 13 symbols according to the width of the US subframe. Since the method of FIG. 5A allocates bursts in each segment, the same message Burst_Type is used for segments. In order to discriminate between two or more segments, the message Burst_Type may be expressed by varying the number of bits.

For example, in the case of the second zone ZONE 2 and the third zone ZONE 3 of FIG. 2, since bursts are allocated in segments of 7 to 13 symbols, the same message Burst_Type may be expressed by 1 bit for both the second zone ZONE 2 and the third zone ZONE 3. In order to allocate bursts by discriminating between the second zone ZONE 2 and the third zone ZONE 3, a 2-bit message Burst_Type may be expressed for the second zone ZONE 2 or the third zone ZONE 3.

FIG. 5B illustrates a US-MAP IE whose 2-bit message Subchannel_Type is used when a diversity subchannel and an AMC subchannel coexist. Referring to FIG. 5B, the 2 bits of the message Subchannel_Type specifies a subchannel type and a burst type defined by this US-MAP IE. A message Burst_Type may be expressed as '00' when bursts are mapped along a time axis over the entire width of a US subframe before incrementing along a frequency axis. These bursts are allocated in a diversity subchannel zone. The message Burst_Type may be expressed as '01' when bursts are mapped along the time axis over segments of 7 symbols before incrementing along the frequency axis and then re-tracing to a lowest unused subchannel in a next 7 to 13 symbol segment. These bursts are allocated in a diversity subchannel zone. The width of a last segment ranges from 7 to 13 symbols according to the width of the US subframe. The message Burst_Type may be expressed as '10' when bursts are mapped along the time axis over the entire width of the US subframe before incrementing along the frequency axis. These bursts are allocated in an AMC subchannel zone. "11" is reserved. Since the method FIG. 5B allocates bursts in each segment, the same message Burst_Type is used for segments. In order to discriminate between two or more segments, a reserved bit may be used or the message Burst_Type may be expressed by varying the number of bits.

For example, in the case of the second zone ZONE 2 and the third zone ZONE 3 of FIG. 2, since bursts are allocated in segments of 7 to 13 symbols, the same message Burst_Type may be expressed by 2 bits for both the second zone ZONE 2 and the third zone ZONE 3 as shown in FIG. 5B. Alternatively, in order to allocate bursts by discriminating between the second zone ZONE 2 and the third zone ZONE 3, the message Burst_Type may be expressed for the second zone ZONE 2 or the third zone ZONE 3 by adding a reserved bit as shown in FIG. 5C.

Referring to FIGS. 2 and 5C, a message Burst_Type may be expressed as '00' when bursts are mapped along a time axis over the entire width of a US subframe before incrementing along a frequency axis. These bursts are allocated in a diversity subchannel zone ZONE 1. The message Burst_Type may be expressed as '01' when bursts are mapped along the time axis over segments of 7 symbols before incrementing along the frequency axis, and then re-tracing to a lowest unused subchannel in a next 7 to 13 symbol segment. These bursts are allocated in a diversity subchannel zone ZONE 2. The message Burst_Type may be expressed as '10' when bursts are mapped along the time axis over segments of 7 to 13 symbols before incrementing along the frequency axis and then re-tracing to a lowest unused subchannel in a next 7 to 13 symbol segment. These bursts are allocated in a diversity subchannel zone ZONE 3. The message Burst_Type may be expressed as '11' when bursts are mapped along the time axis over the entire width of the US subframe before incrementing along the frequency axis. These bursts are allocated in an AMC subchannel zone.

Figure 6:
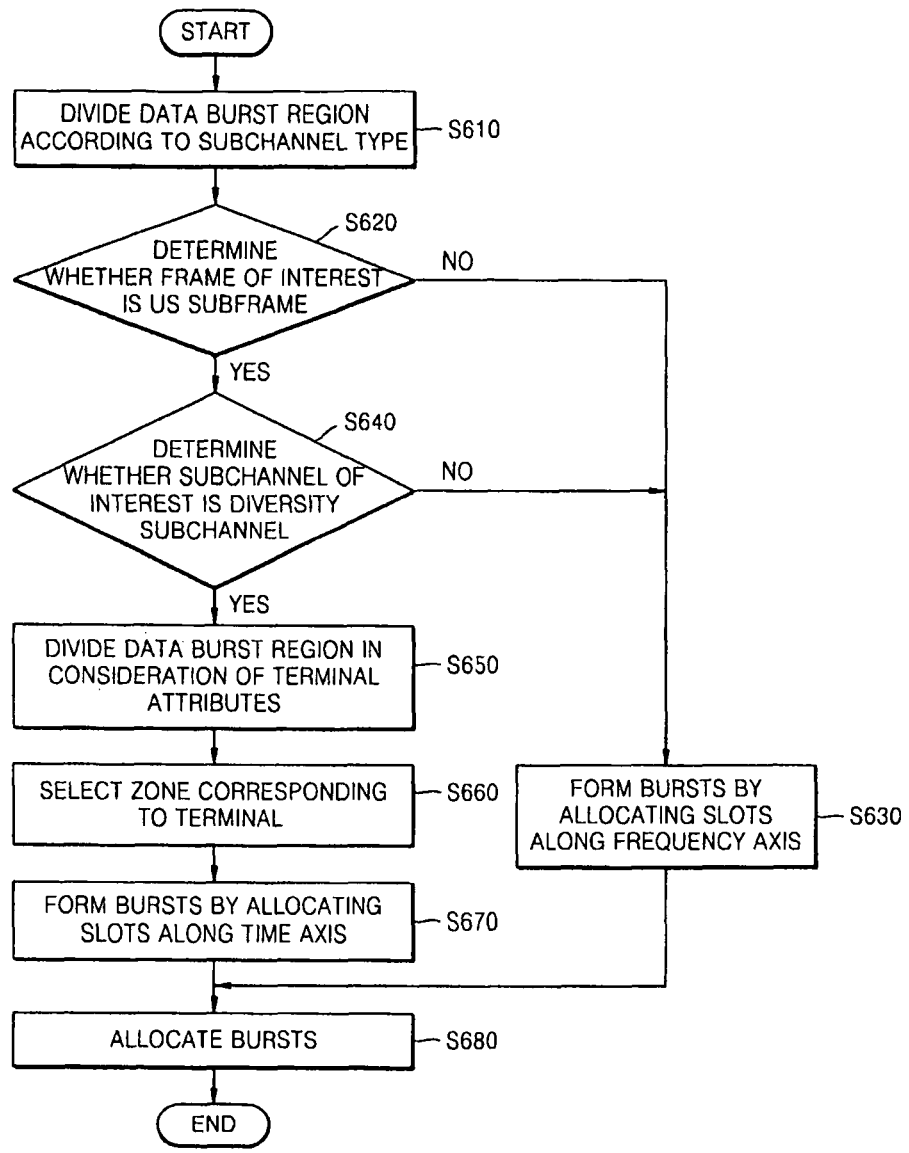
FIG. 6 is a flowchart illustrating a method of allocating hybrid bursts in a wireless communication system according to an embodiment of the present invention.
Figure 7:
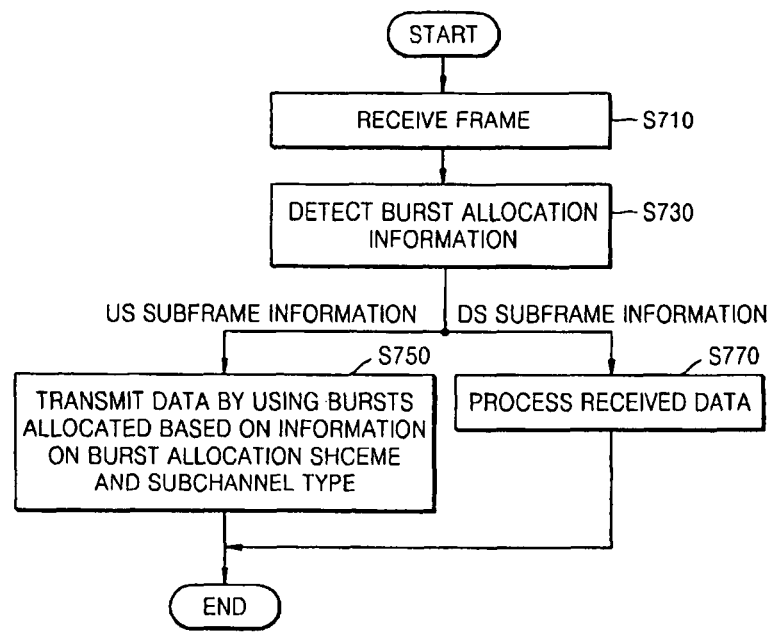
FIG. 7 is a flowchart illustrating a method of allocating bursts by a base station to terminals in a wireless communication system according to an embodiment of the present invention.

FIG. 6 is a flowchart illustrating a method of allocating hybrid bursts in a wireless communication system according to an embodiment of the present invention. FIG. 7 is a flowchart illustrating a method of allocating bursts by a base station to terminals in a wireless communication system according to an embodiment of the present invention. In the following description, a repeated explanation will not be given of overlapped features.

Referring to FIG. 6, bursts mapped along a frequency axis for downstream data transmission are sequentially allocated to the respective terminals, and bursts mapped a long a time axis for upstream data transmission are sequentially allocated to the respective terminals.

In operation S610, a data burst region for data transmission in each of a DS subframe and a US subframe is divided into a band AMC subchannel zone and a diversity subchannel region according to a subchannel type. The dividing according to the subchannel type is optional.

In operation S620, it is determined whether a subframe of interest is the US subframe or the DS subframe. If it is determined in operation S620 that the subframe of interest is the DS subframe, the method proceeds to operation S630. In operation S630, bursts are formed by allocating slots of a predetermined size along a frequency axis in both a diversity subchannel and a band AMC subchannel. In operation S680, the bursts are sequentially allocated to the respective terminals.

If it is determined in operation S620 that the subframe of interest is the US subframe, the method proceeds to operation S640. In operation S640, it is determined whether a subchannel of interest is a diversity subchannel or a band AMC subchannel. If it is determined in operation S640 that the subchannel of interest is the diversity subchannel, the method proceeds to operation S650. In operation S650, the data burst region is divided into a plurality of zones dependent on the number of symbols of the US subframe in consideration of terminal attributes. In operation S660, a zone is selected from the plurality of zones according to the terminal attributes. In operation S670, bursts are formed by allocating slots of a predetermined size along a time axis in the selected zone. In operation S680, the bursts are sequentially allocated to the terminals. In a zone including all symbols of the data burst region of the US subframe, bursts mapped along the time axis of the data burst region are sequentially allocated to the terminals. When a remaining portion other than the zone including all the symbols is divided into one or more segments and each of the segments includes a minimum number of symbols necessary for channel estimation, bursts mapped along the time axis in the segments are sequentially allocated to the terminals. For example, bursts of the first zone ZONE 1 of FIG. 2 are allocated to a terminal sensitive to power, bursts of the second zone ZONE 2 of FIG. 2 are allocated to a terminal sensitive to propagation latency, and bursts of the third zone ZONE 3 of FIG. 2 are allocated to a terminal requiring a quick response from a base station. Information on a corresponding zone, a burst allocation scheme, and a subchannel type may be transmitted to a terminal through a MAP message.

If it is determined in operation S640 that the subchannel of interest is the band AMC subchannel, the method proceeds to operation S630. In operation S630, bursts are formed by allocating slots of a predetermined size along the frequency axis. In operation S680, the bursts are sequentially allocated to the terminals.

Referring to FIG. 7, in operation S710, a terminal receives a frame of an OFDM signal including burst allocation information from a base station.

In operation S730, the terminal detects the burst allocation information of each of a DS subframe and a US subframe from the received frame of the OFDM signal. The burst allocation information includes information on a diversity subchannel region and a band AMC subchannel region, and information on bursts mapped along a frequency axis and bursts mapped along a time axis.

In operation S750, the terminal determines the position of bursts by using a subchannel type and a burst allocation scheme from the burst allocation information of the US subframe, processes data by using bursts allocated based on the determined position, and transmits the processed data to the base station.

In operation S770, the terminal processes received data by using bursts allocated based on a position determined from the burst allocation information of the DS subframe.

Figure 8:
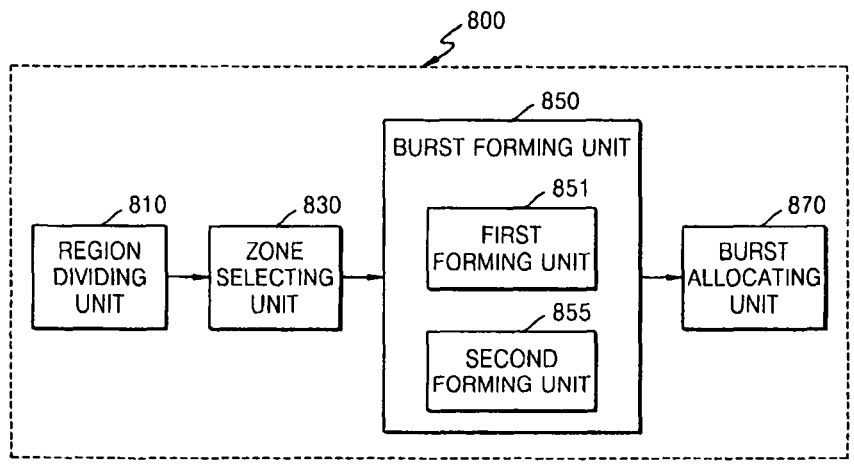
FIG. 8 is a block diagram of an apparatus for allocating hybrid bursts in a wireless communication system according to an embodiment of the present invention.

FIG. 8 is a block diagram of an apparatus for allocating hybrid bursts in a wireless communication system according to an embodiment of the present invention. In the following description, a repeated explanation will not be given of overlapped features.

Referring to FIG. 8, the apparatus includes a region dividing unit 810, a zone selecting unit 830, a burst forming unit 850, and a burst allocating unit 870.

The region dividing unit 810 divides a data burst region of each of a US subframe and a DS subframe constituting a frame into a band AMC subchannel region and a diversity subchannel region. The region dividing unit 810 identifies a zone including all symbols of the US subframe in the data burst region of the diversity subchannel region of the US subframe, and divides a remaining portion other than the zone into one or more segments in a time domain. Each of the segments includes a minimum number of symbols necessary for channel estimation. The diversity subchannel region of the US subframe may be divided into three zones as shown in FIG. 2 in consideration of terminal attributes, a zone adaptive to a terminal may be selected, and bursts of the selected zone may be allocated to the terminal.

The zone selecting unit 830 selects one of the zones on the basis of channel environment and terminal attributes. The zone selecting unit 830 selects the diversity subchannel region or the AMC subchannel region, and selects one of the zones of the diversity subchannel region in the US subframe.

The burst forming unit 850 includes a first burst forming unit 851 and a second burst forming unit 855. The first burst forming unit 851 forms bursts mapped to slots along a time axis based on the terminal attributes in the selected zone of the US subframe. The second burst forming unit 855 forms bursts mapped to slots along a frequency axis based on the channel environment in the data burst region of the DS subframe.

The burst allocating unit 870 allocates the formed bursts to respective terminals. The burst allocating unit 870 allocates the bursts to the respective terminals while expressing burst allocation information on a burst allocation scheme or a subchannel type as a predetermined bit to a DS-MAP IE or a US-MAP IE.

The base station transmits a frame generated by performing OFDM on the burst allocation information and transmitted data to the terminals.

Figure 9:
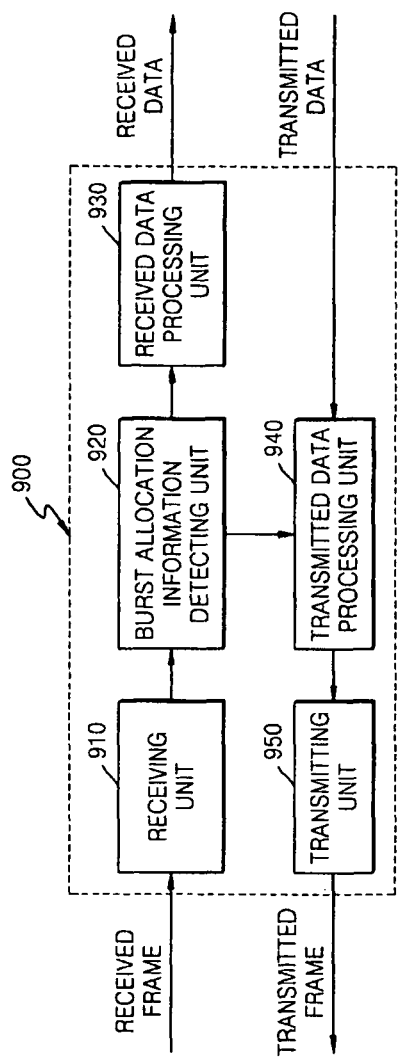
FIG. 9 is a block diagram of a terminal that is allocated hybrid bursts in a wireless communication system according to an embodiment of the present invention.

FIG. 9 is a block diagram of a terminal 900 that is allocated hybrid bursts in a wireless communication system according to an embodiment of the present invention. In the following description, a repeated explanation will not be given of overlapped features.

Referring to FIG. 9, the terminal 900 includes a receiving unit 910, a burst allocation information detecting unit 920, a received data processing unit 930, a transmitted data processing unit 940, and a transmitting unit 950.

The receiving unit 910 receives a frame of an OFDM signal from a base station.

The burst allocation information detecting unit 920 detects burst allocation information of each of a US and a DS from the received frame of the OFDM signal. The burst allocation information detecting unit 920 detects US burst information including a subchannel type and a burst allocation scheme from a US-MAP IE, and detects DS burst information from a DS-MAP IE.

The received data processing unit 930 decodes data by processing received data by using bursts allocated for the DS based on the detected burst information.

The transmitted data processing unit 940 encodes data by determining the position of bursts allocated for the US based on the detected burst information and processing transmitted data by using the allocated bursts.

The transmitting unit 950 transmits a frame of the encoded transmitted data to the base station.

While the present invention has been described by using the wireless communication system according to IEEE 802.22, it will be understood by one of ordinary skill in the art that other wireless communication systems may be used and various changes in form and detail can be made without departing from the spirit and scope of the present invention.

The present invention may be embodied as computer-readable codes on a computer-readable recording medium. The computer-readable recording medium is any data storage device that can store data which can be thereafter read by a computer system. Examples of the computer-readable recording medium include read-only memories (ROMs), random-access memories (RAMs), CD-ROMs, magnetic tapes, floppy disks, optical data storage devices, and carrier waves (such as data transmission through the Internet). The computer-readable recording medium can also be distributed over network coupled computer systems so that the compute readable code is stored and executed in a distributed fashion. Also, functional programs, codes, and code segments for embodying the present invention may be easily deducted by programmers in the art which the present invention belongs to.

While the present invention has been particularly shown and described with reference to exemplary embodiments thereof using specific terms, the embodiments and terms have been used to explain the present invention and should not be construed as limiting the scope of the present invention defined by the claims.

The preferred embodiments should be considered in descriptive sense only and not for purposes of limitation. Therefore, the scope of the invention is defined not bye the detailed description of the invention but by the appended claims, and all differences within the scope will be construed as being included in the present invention.

The invention claimed is:

1. A method of allocating hybrid bursts by a base station to one or more terminals in a wireless communication system, the method comprising:
   (b) sequentially allocating bursts, which are mapped along a time axis for upstream data transmission, to the respective terminals,
   wherein operation (b) comprises:
   (b1) dividing a data burst region of an upstream subframe into a plurality of zones determined by a frequency domain and a time domain;
   (b2) selecting a zone corresponding to terminal attributes from among the plurality of zones; and
   (b3) sequentially allocating bursts, which are mapped along the time axis in the selected zone to the respective terminals,
   wherein operation (b1) comprises dividing the data burst region of the upstream subframe into a first zone comprising all symbols of the data burst region of the upstream subframe and a remaining portion other than the first zone, and dividing the remaining portion other than the first zone into a second zone and a third zone in the time domain,
   wherein operation (b2) comprises selecting the first zone for a power sensitive terminal in order to maximize transmission power, and selecting the second zone for a latency sensitive terminal requiring a quick response, and
   wherein the second zone for a latency sensitive terminal requiring a quick response has a width that is a predetermined number of symbols that is less than a total number of symbols in the data burst region and is at a beginning of the time axis of the data burst region in order to allow additional time to prepare response, and
   wherein operation (b3) comprises sequentially allocating bursts that are located in the first zone and that are each mapped across the entire width of the data burst region to the power sensitive terminal when the first zone is selected, allocating bursts in the second zone to the latency sensitive terminal when the second zone is selected, and allocating bursts in the third zone when the third zone is selected,
   wherein operation (b3) further comprises allocating bursts located in the first zone to a power-limited terminal that is located at a cell boundary and does not permit line-of-sight propagation in order to maximize transmission power;
   allocating bursts located in the second zone to a terminal that requires a quick response in a downstream subframe of a next frame in order to minimize decoding latency till delivering to MAC; and
   allocating bursts located in the third zone to a terminal that is located at a cell boundary and permits line-of-sight propagation and does not have sufficient time to shift form a reception mode to a transmission mode within a transmission (Tx) to reception (Rx) transition gap (TTG) in order for the terminal to get enough time through scheduling.

2. The method of claim 1, wherein operation (b) comprises dividing the data burst region of the upstream subframe into one or more segments in the time domain, and sequentially allocating bursts, which are mapped along the time axis in the segments, to the respective terminals.

3. The method of claim 2, wherein operation (b) comprises, if the quantity of resources for burst mapping in a segment is insufficient, forming bursts by using resources of a next segment.

4. The method of claim 2, wherein the number of symbols of each of the segments is greater than the minimum number of symbols necessary for channel estimation, and the number of symbols of a last segment is greater than or equal to the minimum number of symbols necessary for channel estimation and less than two times the minimum number of symbols necessary for channel estimation.

5. The method of claim 1, wherein the terminal attributes are determined by at least one of terminal position, channel state, and service type.

6. The method of claim 1, wherein operation (b2) comprises selecting the third zone for a terminal that does not have sufficient time to shift from a reception mode to a transmission mode within a Tx to Rx transition gap.

7. The method of claim 1, wherein the number of symbols of each of the zones is greater than the minimum number of symbols necessary for channel estimation.

8. The method of claim 1, wherein the bursts are mapped to fixed-size slots each of which is defined as one symbol by one subchannel, and are allocated by using the length of the slots.

9. The method of claim 1, wherein a MAP message comprising information on each of the first through third zones corresponding to terminal attributes is transmitted to a terminal.

10. The method of claim 1, wherein the remaining portion other than the first portion is divided in a manner in which the second zone is prior to the third zone on the time axis, such that a terminal having bursts allocated in the third zone has addition time to shift from a reception mode to a transmission mode.

11. A method of transmitting and receiving data by a terminal using hybrid bursts allocated by a base station in a wireless communication system, the method comprising:
   detecting downstream data burst allocation information from a frame received from the base station; and
   transmitting data by using the upstream data burst allocated based on the detected upstream data burst allocation information,
   wherein the burst allocation information comprises information on a zone selected from a first zone comprising all symbols of a data burst region of an upstream subframe and a second zone and a third zone which are obtained by dividing a remaining portion other than the first zone in a time domain,
   wherein the first zone is used for a power sensitive terminal in order to maximize transmission power and the detected downstream data burst allocation information includes information on bursts each allocated in the first zone across the entire width of the data burst region to the power sensitive terminal, and the second zone is used for a latency sensitive terminal requiring a quick response,
   wherein the second zone for a latency sensitive terminal requiring a quick response has a width that is a predetermined number of symbols that is less than a total number of symbols in the data burst region and is at a beginning of a time axis of the data burst region in order to allow additional time to prepare response, and
   allocating bursts located in the first zone to a power-limited terminal that is located at a cell boundary and does not permit line-of-sight propagation in order to maximize transmission power;

allocating bursts located in the second zone to a terminal that requires a quick response in a downstream subframe of a next frame in order to minimize decoding latency till delivering to MAC; and allocating bursts located in the third zone to a terminal that is located at a cell boundary and permits line-of-sight propagation and does not have sufficient time to shift form a reception mode to a transmission mode within a transmission (Tx) to reception (Rx) transition gap (TTG) in order for the terminal to get enough time through scheduling.

12. The method of claim 11, wherein the bursts are mapped to fixed-size slots, each of which is defined as one symbol by one subchannel, and are allocated by using the length of the slots.

13. The method of claim 11, wherein the burst allocation information comprises information on each of the first through third zones corresponding to terminal attributes.

14. The method of claim 11, wherein the remaining portion other than the first portion is divided in a manner in which the second zone is prior to the third zone on the time axis, such that a terminal having bursts allocated in the third zone has addition time to shift from a reception mode to a transmission mode.

15. An apparatus for allocating hybrid bursts by a base station to one or more terminals in a wireless communication system, the apparatus comprising:

a burst forming unit forming bursts mapped along a time axis for upstream data transmission; and a burst allocating unit sequentially allocating the formed bursts to the respective terminals;

a region dividing unit dividing a data burst region of an upstream subframe into a first zone comprising all symbols of the data burst region of the upstream subframe and a remaining portion other than the first zone, and dividing the remaining portion other than the first zone into a second zone and a third zone in a time domain; and a zone selecting unit selecting the first zone to allocate bursts to a power sensitive terminal sensitive to power in order to maximize transmission power, selecting the second zone to allocate bursts to a latency sensitive terminal requiring a quick response, and selecting a third zone to allocate bursts to a terminal needing additional time to shift from reception mode to transmission mode, wherein the remaining portion other than the first portion is divided in a manner in which the second zone is prior to the third zone on a time axis, such that the second zone is at a beginning of the time axis of the data burst region in order to allow additional time to prepare response for bursts allocated to the second zone and the third zone allows for additional time to shift from a reception mode to a transmission mode for bursts allocated to the third zone, and wherein the burst allocating unit sequentially allocating the formed bursts to the respective terminals further comprises:

allocating bursts located in the first zone to a power-limited terminal that is located at a cell boundary and does not permit line-of-sight propagation in order to maximize transmission power;

allocating bursts located in the second zone to a terminal that requires a quick response in a downstream subframe of a next frame in order to minimize decoding latency till delivering to MAC; and allocating bursts located in the third zone to a terminal that is located at a cell boundary and permits line-of-sight propagation and does not have sufficient time to shift form a reception mode to a transmission mode within a transmission (Tx) to reception (Rx) transition gap (TTG) in order for the terminal to get enough time through scheduling.

16. The apparatus of claim 15, further comprising a region dividing unit dividing the data burst region of the upstream subframe in a time domain into one or more segments, wherein the burst forming unit forms bursts mapped along the entire time axis of the data burst region of the upstream subframe or forms bursts mapped along the time axis in the segments.

17. A terminal apparatus for transmitting and receiving data using hybrid bursts allocated by a base station in a wireless communication system, the terminal apparatus comprising:

a burst allocation information detecting unit detecting upstream data burst allocation information, from a frame received from the base station; and a transmitted data processing unit processing transmitted data by using the upstream data bursts allocated based on the detected upstream data burst allocation information, wherein the burst allocation information comprises information on the allocation of bursts to a zone selected from a first zone comprising all symbols of a data burst region of an upstream subframe and a second zone and a third zone which are obtained by dividing a remaining portion other than the first zone in a time domain, wherein the first zone is used for a power sensitive terminal in order to maximize transmission power, and the second zone is used for a latency sensitive terminal requiring a quick response, wherein the remaining portion other than the first portion is divided in a manner in which the second zone is prior to the third zone on a time axis, such that the second zone is at a beginning of the time axis of the data burst region in order to allow additional time to prepare response for bursts allocated to the second zone and the third zone allows for additional time to shift from a reception mode to a transmission mode for bursts allocated to the third zone;

and wherein bursts located in the first zone are allocated to a power-limited terminal that is located at a cell boundary and does not permit line-of-sight propagation in order to maximize transmission power;

bursts located in the second zone are allocated to a terminal that requires a quick response in a downstream subframe of a next frame in order to minimize decoding latency till delivering to MAC; and bursts located in the third zone are allocated to a terminal that is located at a cell boundary and permits line-of-sight propagation and does not have sufficient time to shift form a reception mode to a transmission mode within a transmission (Tx) to reception (Rx) transition gap (TTG) in order for the terminal to get enough time through scheduling.

18. The terminal apparatus of claim 17, wherein the burst allocation information comprises information on each of the first through third zones corresponding to terminal attributes.

* * * * *